(12) United States Patent
Mitsch et al.

(10) Patent No.: US 6,911,777 B1
(45) Date of Patent: Jun. 28, 2005

(54) CLAMP-ON LOW POWER ISOLATION TRANSFORMER FOR AIRFIELD LIGHTING

(75) Inventors: James M. Mitsch, Simsbury, CT (US); Daniel A. That, South Windsor, CT (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 10/640,275

(22) Filed: Aug. 14, 2003

(51) Int. Cl.[7] .............................................. H01J 13/46
(52) U.S. Cl. ........................ 315/70; 336/196; 336/220
(58) Field of Search ........................... 315/70, 177, 57; 336/210, 212–213, 220–221, 196

(56) References Cited

U.S. PATENT DOCUMENTS

| | | | | |
|---|---|---|---|---|
| 3,829,735 A | * | 8/1974 | Berlock et al. ............. | 315/131 |
| 4,019,167 A | * | 4/1977 | Barker ........................ | 336/96 |
| 4,587,506 A | * | 5/1986 | Hoeksma .................... | 336/178 |
| 4,675,574 A | * | 6/1987 | Delflache ................... | 315/130 |
| 5,625,260 A | * | 4/1997 | Millgard ..................... | 315/136 |
| 5,926,115 A | * | 7/1999 | Schleder et al. ............ | 340/953 |
| 5,969,642 A | * | 10/1999 | Runyon et al. ............. | 340/953 |
| 6,288,917 B1 | * | 9/2001 | Redburn et al. ............. | 363/39 |
| 6,556,017 B1 | * | 4/2003 | Pettersson ................... | 324/414 |

OTHER PUBLICATIONS

Stanley Wolf, Second Edition, *Guide to Electronic Measurements and Laboratory Practice*, Prentice–Hall, Inc., Englewood Cliffs, New Jersey 07532, pp. 94–95.

* cited by examiner

Primary Examiner—Thuy V. Tran
(74) Attorney, Agent, or Firm—Fish & Richardson P.C.

(57) ABSTRACT

A clamp-on isolation transformer for an airfield lighting fixture in an airfield lighting system includes a first portion configured to receive a portion of a primary conductor of a primary current loop and a second portion configured to receive another portion of the primary conductor of the primary current loop at a location opposed to the location of the first portion. An attachment mechanism is configured to attach the first portion to the second portion such that the first and second portions surround the primary conductor. A winding is coupled to the first portion and is configured to be attached to an airfield lighting fixture.

26 Claims, 12 Drawing Sheets

CLAMP-ON LOW POWER ISOLATION TRANSFORMER FOR AIRFIELD LIGHTING

TECHNICAL FIELD

The following description relates to airfield lighting, and in particular to a clamp-on low power isolation transformer for airfield lighting.

BACKGROUND

Airfield lighting systems may use incandescent or LED lighting fixtures connected to an alternating current (AC) loop. Isolation transformers are often used to electrically isolate the lighting fixtures from the primary current loop. In general, the primary current loop is spliced in order to install or replace an isolation transformer in the airfield lighting system. An isolation transformer designed for use with higher power lighting fixtures, such as, for example, incandescent fixtures, may not be optimal for use with lower power lighting fixtures such as, for example, LED fixtures.

SUMMARY

Techniques are used to provide a clamp-on low power isolation transformer for airfield lighting. The clamp-on isolation transformer may be installed without splicing the primary current loop. Consequently, installation time and cost will be decreased using the clamp-on isolation transformer. Also, use of the clamp-on isolation transformer results in increased safety for workers installing or replacing the transformer. The techniques are often used with low power lighting fixtures, such as LED lighting fixtures. However, the techniques may be used, if desired, with higher power lighting fixtures, such as incandescent fixtures. The techniques may be used with new airfield lighting installations or with existing airfield lighting installations.

In one general aspect, a clamp-on isolation transformer for an airfield lighting fixture in an airfield lighting system includes a first portion configured to receive a portion of a primary conductor of a primary current loop and a second portion configured to receive another portion of the primary conductor of the primary current loop at a location opposed to the location of the first portion. An attachment mechanism is configured to attach the first portion to the second portion such that the first and second portions surround the primary conductor. A winding is coupled to the first portion and is configured to be attached to an airfield lighting fixture.

Implementations may include one or more of the following features. For example, the transformer may include a low power airfield lighting fixture, such as an LED lighting fixture, connected to the winding. The attachment mechanism may be a hinge attached to the first portion and the second portion, and also may be a locking mechanism. Also, the first portion may be constructed so as to be at least partially connected to the second portion. The first portion may include a first core, which may define a first core window, and the second portion may include a second core, which may define a second core window. The first portion may include a first secondary winding and the second portion may include a second secondary winding. An electrical connection may be configured to be attached between the first secondary winding and the second secondary winding.

In another general aspect, a method of installing a clamp-on isolation transformer for an airfield lighting fixture in an airfield lighting system includes positioning a first portion of a clamp-on isolation transformer to receive a portion of a primary conductor of a primary current loop and positioning a second portion of a clamp-on isolation transformer to receive another portion of the primary conductor of the primary current loop at a location opposed to the location of the first portion. A winding is coupled to the first portion and configured to be attached to an airfield lighting fixture.

Implementations may include one or more of the following features. For example, the first portion may be attached to the second portion. Also, an airfield lighting fixture may be connected to the secondary winding.

Other features will be apparent from the description and drawings, and from the claims.

DETAILED DESCRIPTION

Figure 1:
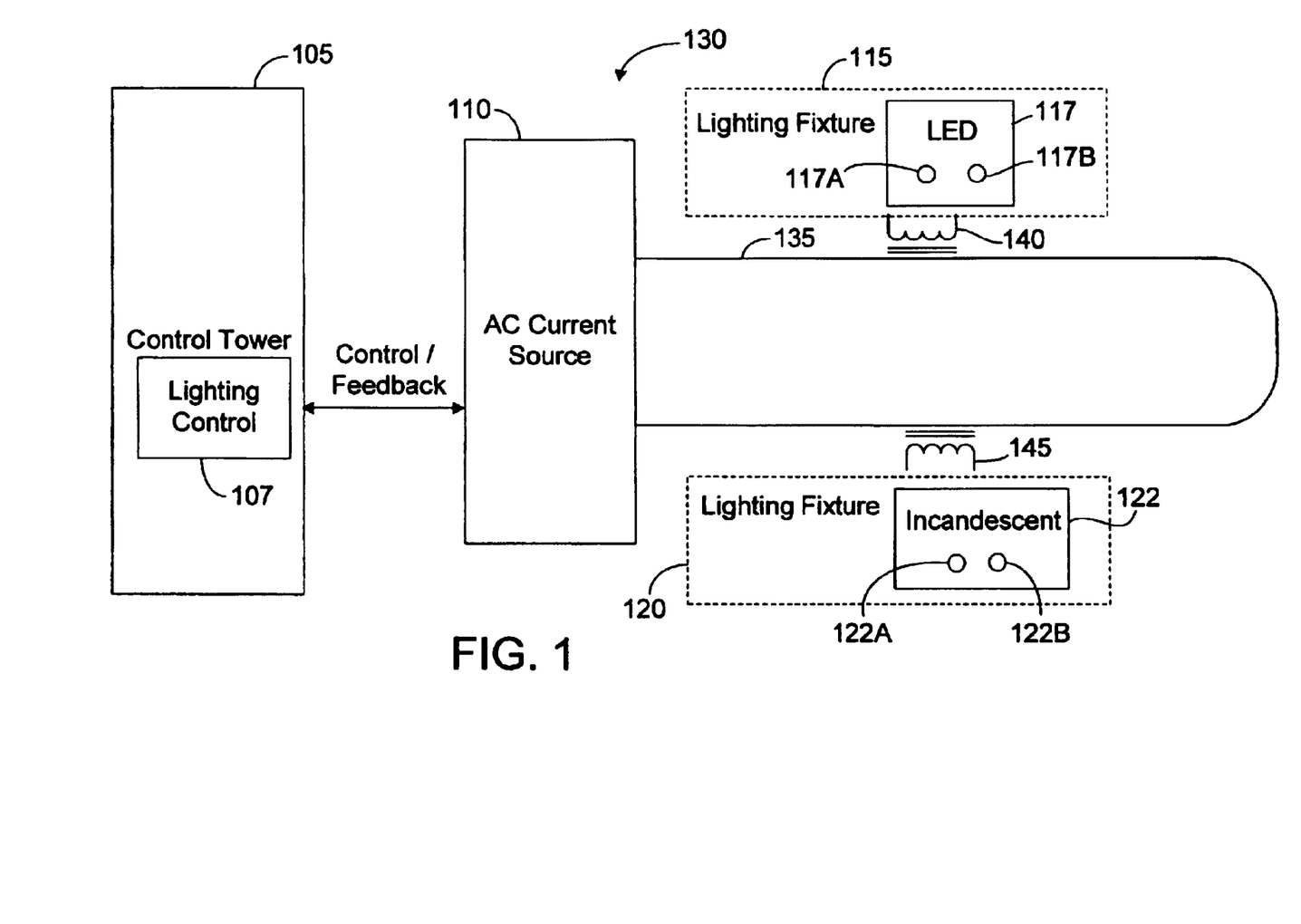
FIG. 1 is a block diagram of an airfield lighting system that uses a clamp-on low power isolation transformer for airfield lighting.

As shown in FIG. 1, an airfield lighting system 100 uses an AC current source 110 to power lighting fixtures 115 and 120. Typically, an air traffic controller stationed in a control tower 105 monitors and adjusts the lighting system 100 using a lighting control panel 107. The illumination intensity of the airfield lighting may be controlled by manipulating controls in the lighting control panel 107 so as to vary the output current of the AC current source 110. The intensity control may involve a one-way or two-way communication between the lighting control panel 107 and the AC current source 110.

AC current source 110 typically is a constant current regulator. Lighting fixtures 115 and 120 may include, among other components, a power supply and either an LED light source or an incandescent light source. As shown, lighting fixture 115 contains an LED lighting source and lighting fixture 120 contains an incandescent source. In particular, lighting fixture 115 contains an LED lighting assembly 117 having LEDs 117A and 117B, and lighting fixture 120 contains an incandescent lighting assembly 122 having incandescent lights 122A and 122B. Clamp-on isolation transformers 140 and 145 are used to electrically isolate lighting fixtures 115 and 120 from AC current source 110. The clamp-on isolation transformers may be installed without splicing the primary current loop 130. As a result, use of the isolation transformers decreases installation time and cost while increasing safety for workers. Although only two fixtures 115 and 120 are shown, AC current source 110 typically powers a large number of fixtures in the airfield lighting system 100.

The AC current source 110 and a primary conductor 135 form the primary current loop 130. The primary conductor 135 carries the AC current from the AC current source 110 through the loop 130.

The clamp-on isolation transformer 140 is connected between the primary conductor and the lighting fixture 115, and is used to electrically isolate the lighting fixture 115 from the primary conductor 135 while permitting the primary conductor 135 to provide AC power to the lighting fixture 11 5 through the isolation transformer 140.

Similarly, the clamp-on isolation transformer 145 is connected between the primary conductor 135 and the lighting fixture 120, and is used to electrically isolate lighting fixture 120 from the primary conductor 135. The primary conductor 135 provides AC power to the lighting fixture 120 through the isolation transformer 145.

Although only two lighting fixtures 115 and 120 are shown, multiple lighting fixtures may be coupled to the primary current loop 130. In general, lighting fixtures 115 and 120 are connected to the primary current loop 130 such that a failure in one lighting fixture does not affect the other lighting fixtures. For example, a failure in lighting fixture 115 does not affect lighting fixture 120.

A lighting fixture 115 containing LED light sources may be used in combination with, or as a replacement for, a lighting fixture 120 containing an incandescent light source. LED lighting fixtures require less power than comparable incandescent lighting fixtures. Therefore, the design parameters of an isolation transformer 140 used with an LED lighting fixture 115 may differ from the design parameters of an isolation transformer 145 used with an incandescent lighting fixture 120. For example, the size and number of turns on the secondary winding of isolation transformer 140 may differ from the size and number of turns on the secondary winding of isolation transformer 145. For instance, a typical clamp-on isolation transformer for an LED airfield lighting fixture has a rating of approximately 5 watts. The amount of power transferred from the primary loop 130 by the isolation transformer 140 is related to the length of the transformer along the primary conductor 135. Therefore, a much larger transformer would be required for an incandescent airfield lighting fixture, which typically has a rating of approximately 45 watts.

Figure 2:
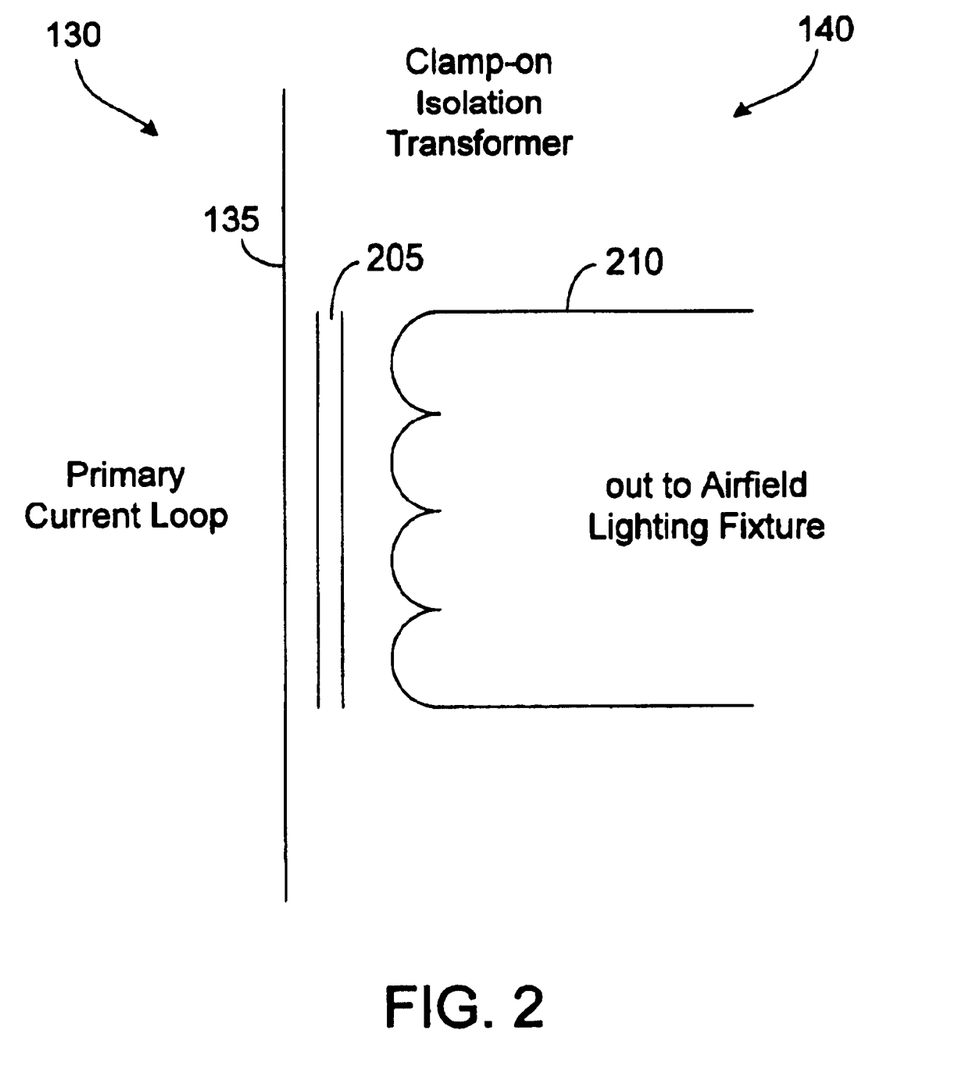
FIG. 2 is a circuit schematic diagram of a clamp-on low power isolation transformer used in the system of FIG. 1.

As shown in FIG. 2, a clamp-on isolation transformer 140 includes a transformer core 205 and a secondary winding 210. The primary conductor 135 of the primary loop 130 serves in the role of the primary winding of the transformer. The core may be made of a suitable magnetic material such as iron. The secondary winding 210 is configured to be attached to the airfield lighting fixture, and has a predetermined number of turns to provide a desired output voltage to the airfield lighting fixture. The clamp-on transformer 140 is configured to be attached to the primary conductor 135 in such a manner as to not require splicing of the primary conductor.

In operation, the AC current in the primary conductor 135 creates a magnetic field. The change in the magnetic flux induces an electromotive force (emf) in the secondary winding 210. The induced emf creates an AC current in the secondary winding 210 which is used to power the airfield lighting fixture. In particular, the AC current in the primary conductor 135 produces an alternating magnetic field (B).

As is well known, the magnetic field at a distance R from a long wire carrying a current I is described by equation (1):

$$B = \frac{\mu_0 \times 2I}{4\pi \times R} \quad (1)$$

where $\mu_0$ is the permeability of the core material

The alternating magnetic field produces a change in the magnetic flux ($\phi_m$) in the secondary winding. Assuming the magnetic field has a constant magnitude B and is everywhere at right angles to a plane surface of the secondary winding having an area A, then the flux is described by equation (2):

$$\phi_m = BA \quad (2)$$

The changing magnetic flux produces an induced emf ($\epsilon$), which in turn produces an alternating current in the secondary winding. The induced emf in the secondary winding is described by equation (3) for a secondary winding having an induced electric field E, a number of turns N, a width l, and being at a distance r from the primary conductor:

$$\varepsilon = \oint_C E \times dl = -\frac{d\phi_m}{dt} = N\pi r^2 \frac{dB}{dt} \quad (3)$$

The power requirement for low power lighting sources, such as, for example, LEDs, is significantly less than the power requirement of traditional incandescent light sources. The lower power requirement of LED lighting sources allows for a reduction in the number of turns N in the secondary winding required to transmit sufficient power out of the clamp-on isolation transformer to the lighting fixture relating to a secondary suitable for use with an incandescent light source. For example, the time rate of change of the magnetic field, dB/dt' is constant when the alternating current and the secondary winding radius distance, r, are constant. Thus, as the amount of required current decreases, the required emf ($\epsilon$) decreases, which in turn decreases the number of turns N required to power the lighting fixture. Alternatively, with the lower power requirement of LED lighting, a higher power transformer may be used to power multiple LED lighting fixtures.

Figure 3:
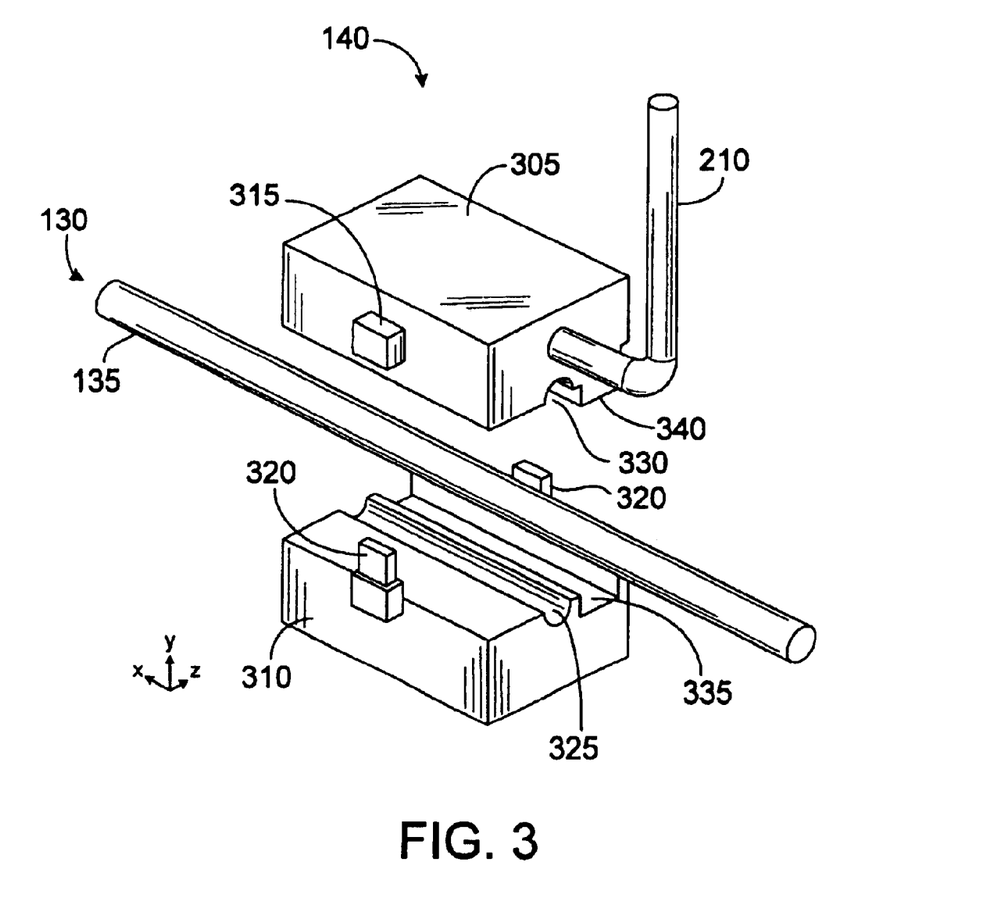
FIG. 3 is a perspective view of one implementation of the clamp-on low power isolation transformer.
Figure 4:
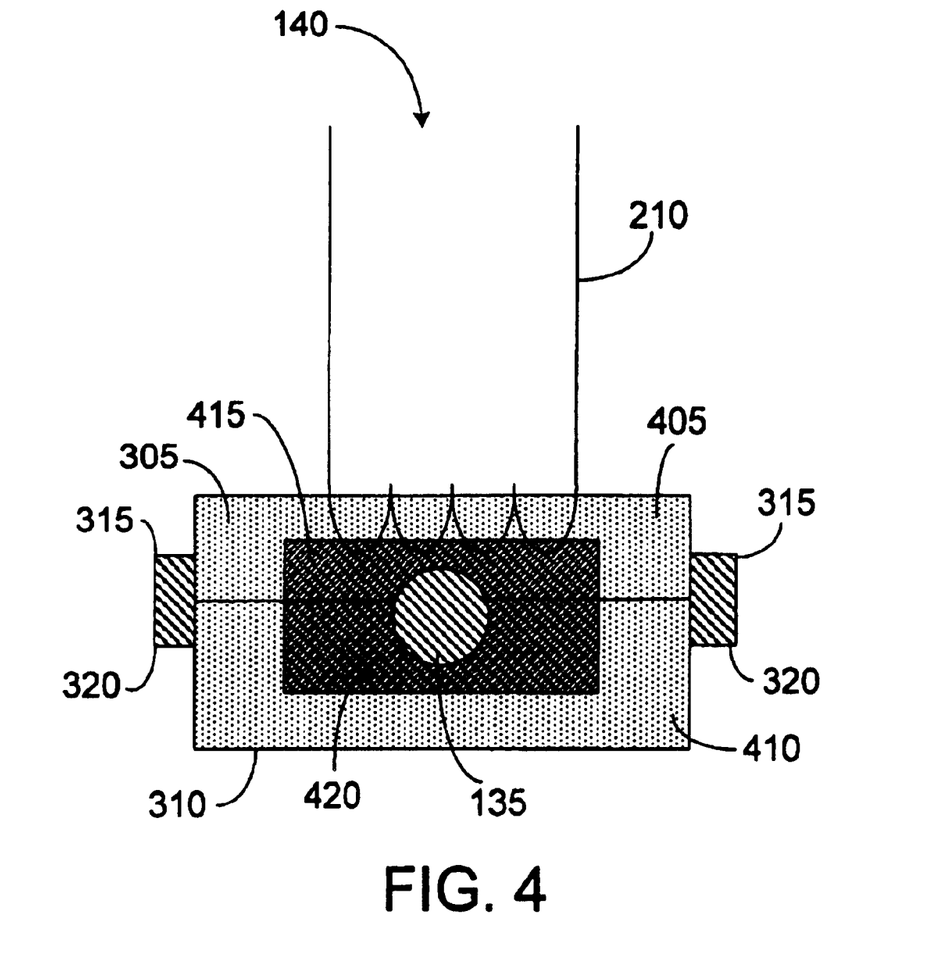
FIG. 4 is a cut-away end view of the clamp-on low power isolation transformer of FIG. 3.

As shown in FIGS. 3 and 4, an exemplary clamp-on isolation transformer 140 includes a first portion 305 and a second portion 310. The first portion 305 and the second portion 310 include a transformer core made of a magnetizable material such as, for example, iron. As shown, a secondary winding 210 is located in the first portion 305. In another implementation, the secondary winding may be located in the second portion 310.

The first portion 305 has an attachment mechanism 315 configured to engage an attachment mechanism 320 on the second portion 310. More than one set of attachment mechanisms 315 and 320 may be used. Attachment mechanisms 315 and 320 are configured to secure the position of the first portion 305 and the second portion 310 with respect to each other and with respect to the primary conductor 135. In other words, the attachment mechanisms 315 and 320 assist in clamping the first portion 305 and the second portion 310 of the transformer 140 to the primary conductor 135 of the current loop 130. To install the transformer 140, the first portion 305 and the second portion 310 are positioned over the primary conductor 135 at a desired location on the primary loop 130, and then the first portion 305 is secured to the second portion 310 with the assistance of the attachment mechanisms 315 and 320. Thus, the primary loop 130 need not be spliced in order to attach the clamp-on transformer 140. In addition, insulation does not need to be removed from the primary conductor 135 in order to attach the transformer 140. Once attached to the primary loop 130, the transformer 140 transfers power from the primary loop 130 to the lighting fixture 115 (shown in FIG. 1).

In one implementation, the first portion 305 and the second portion 310 are physically separate units, and attachment mechanisms 315 and 320 are used on at least two sides of the transformer 140. In another implementation, attachment mechanisms 315 and 320 are used on one side of the transformer 140 and a hinge mechanism (not shown) is used on the other side so as to give the transformer a "clam shell" configuration. Attachment mechanism 315 and attachment mechanism 320 may be identical or may be of different configurations. Known attachment mechanisms may be used.

A second channel 325 is formed in the second portion 310 and is configured to conform to the shape of the primary conductor 135 to which the second portion 310 will be clamped. Similarly, a first channel 330 is formed in the first portion 305 and is configured to conform to the shape of the primary conductor 135 to which the first portion 305 will be clamped. The first channel 330 and the second channel 325 assist with the attachment of the first portion 305 and the second portion 310 to the primary conductor 135. A groove 335 may be formed in the second portion 310, and a tongue 340 may be formed in the first portion 305 to assist in the mating and clamping of the second portion 310 to the first portion 305.

Figure 5:
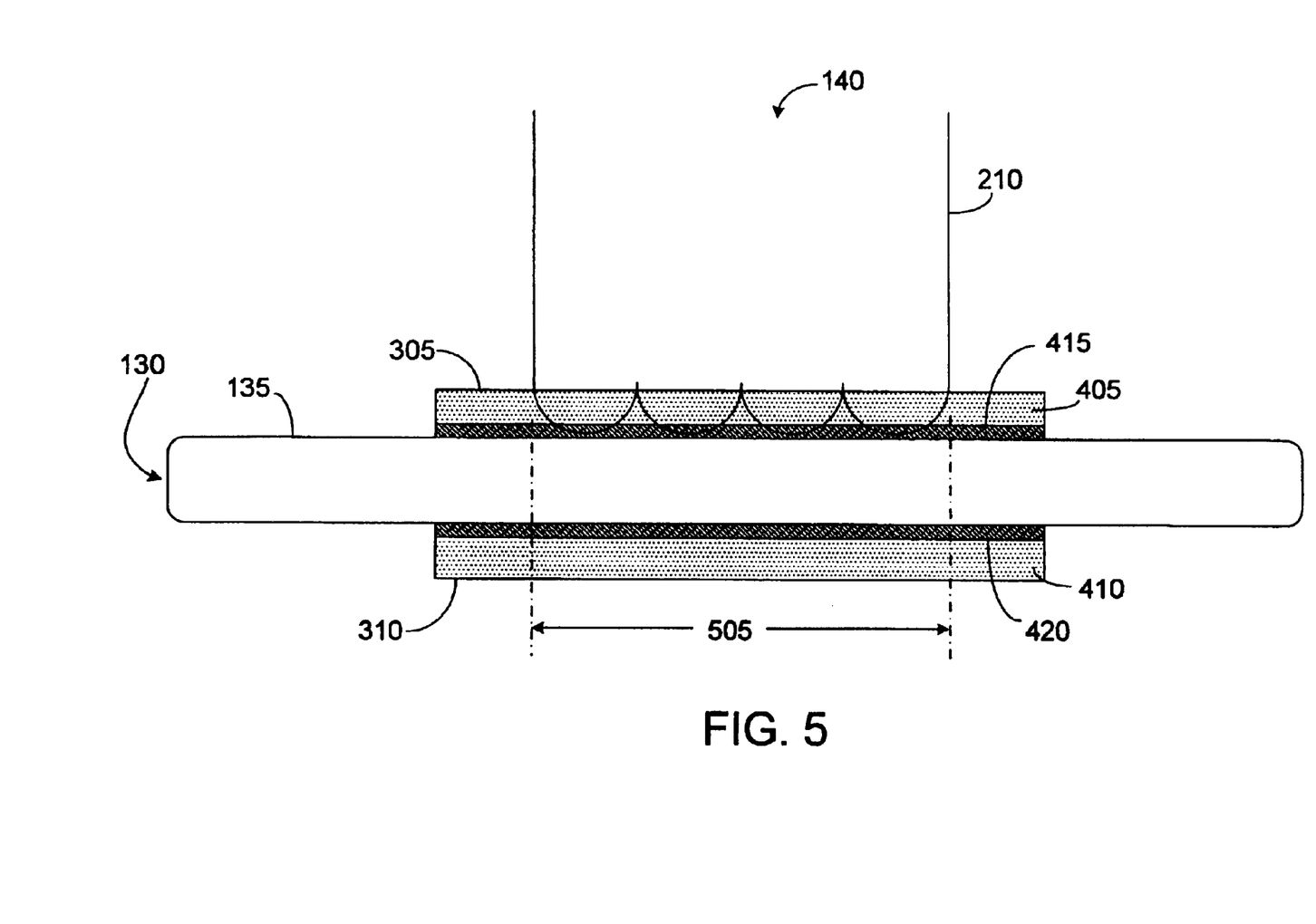
FIG. 5 is a cut-away side view of the clamp-on low power isolation transformer of FIG. 3.

As shown in FIGS. 4 and 5, the first portion 305 includes a first core 405 having a first core window 415, and the second portion 310 includes a second core 410 having a second core window 420. First core 405 and second core 410 are made of a magnetizable material such as iron. The first core window 415 and second core window 420 may be air filled, or may be filled with an insulating material. The first core 405 and the second core 410 and/or the first core window 415 and the second core window 420 may be shaped so as to conform to the shape of the primary conductor 135. As shown, the secondary winding 210 is wrapped around the first magnetic core 405 of the first portion 305.

As shown particularly in FIG. 5, the secondary winding 210 is wrapped around the first magnetic core 405 for a length 505 of the first portion 305.

Figure 6:
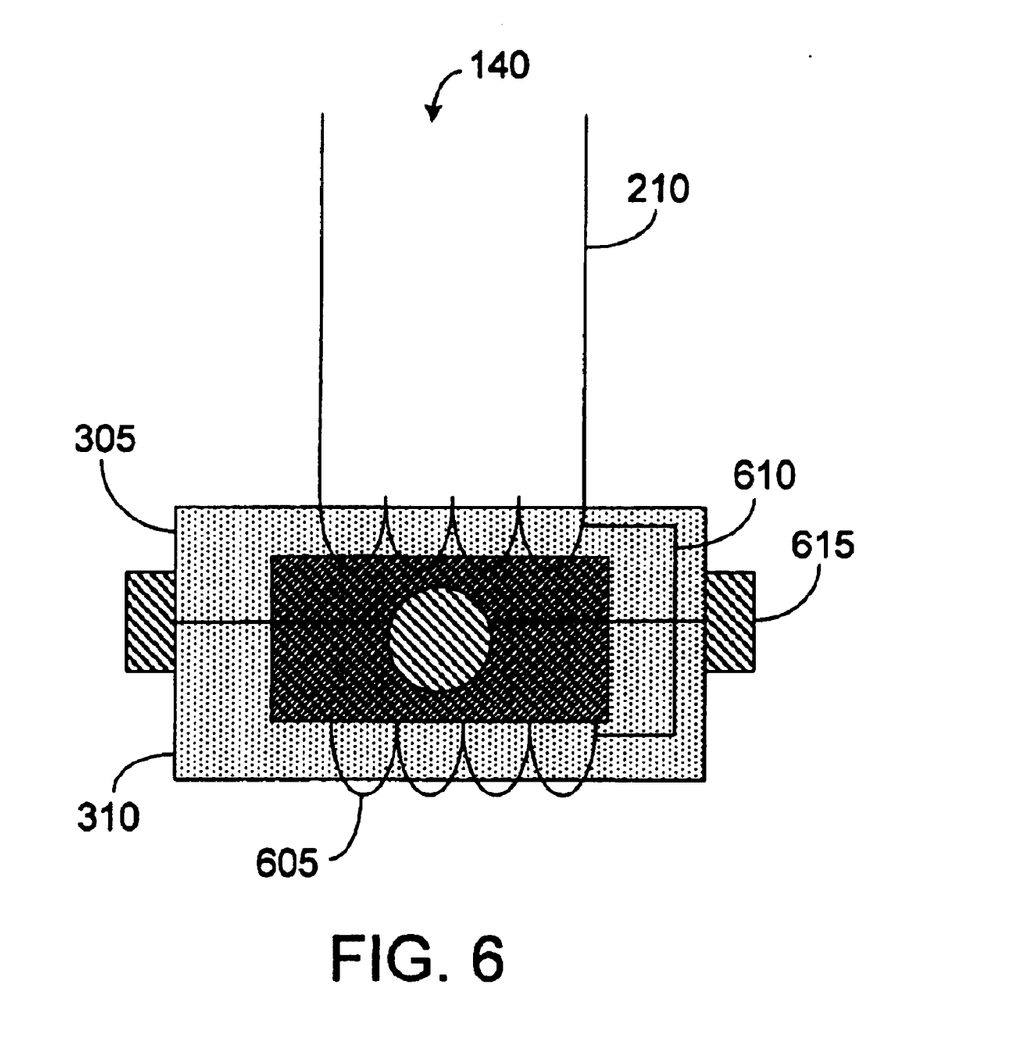
FIGS. 6 and 7 are cut-away end views of implementations of the clamp-on low power isolation transformer.

As shown in FIG. 6, an exemplary clamp-on isolation transformer 140 includes a first portion 305 and a second portion 310. A first secondary winding 210 is located in the first portion 305 and a second secondary winding 605 is located in the second portion 310. In one implementation, the first secondary winding 210 maybe electrically separate from the second secondary winding 605. In another implementation, the first secondary winding 210 may be electrically connected to the second secondary winding 605. The first secondary winding 210 and the second secondary winding 605 may be configured to form one single winding. Electrical contacts 610 may be provided to enable electrical connectivity between the first secondary winding 210 and the second secondary winding 605. A hinge 615 may be provided to join the first portion 305 to the second portion 310.

Figure 7:
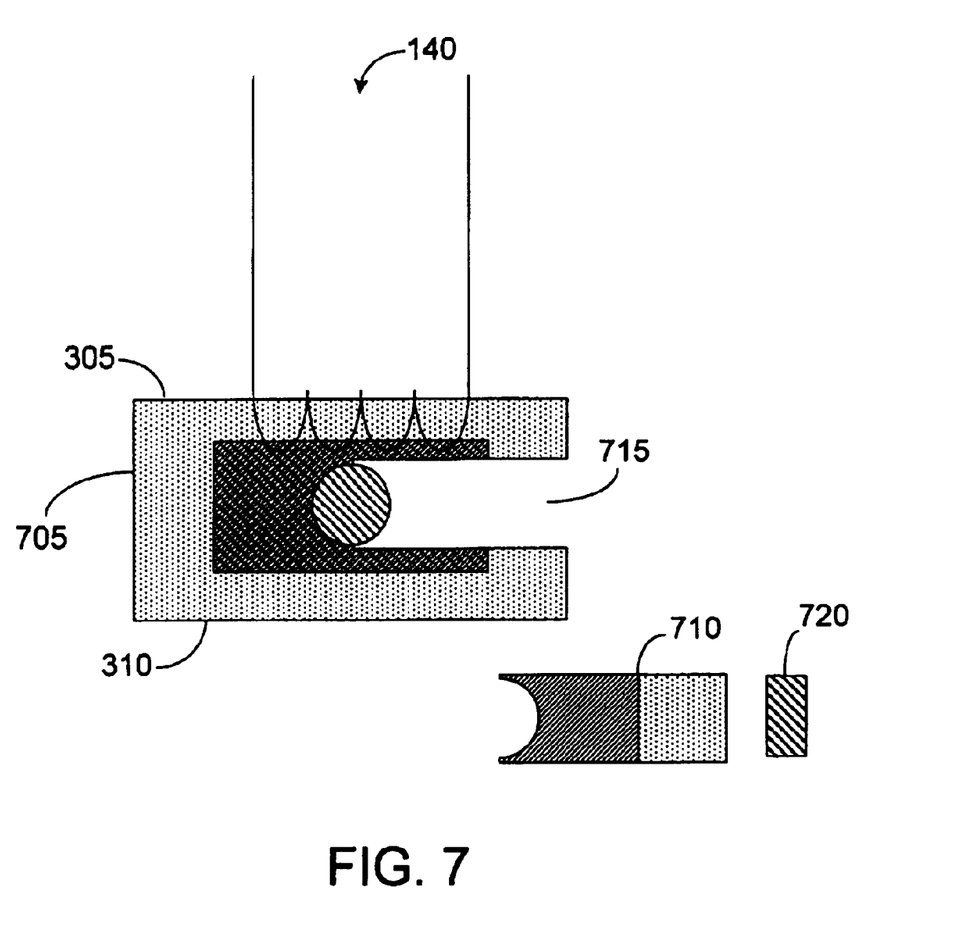

As shown in FIG. 7, the first portion 305 and the second portion 310 are at least partially formed as one physical unit. For example, the first portion 305 and second portion 310 may be formed in a "C" shaped configuration 705. A third portion 710 may be inserted into a void 715 and secured in place with an attachment mechanism 720. The transformer 140 may include two or more pieces. For example, as shown, the first portion 305 and the second portion 310 may be formed as a single "C" shaped physical unit 705, and a third portion 710 may be configured to be attached to the combined first portion 305 and second portion 310.

Figure 8:
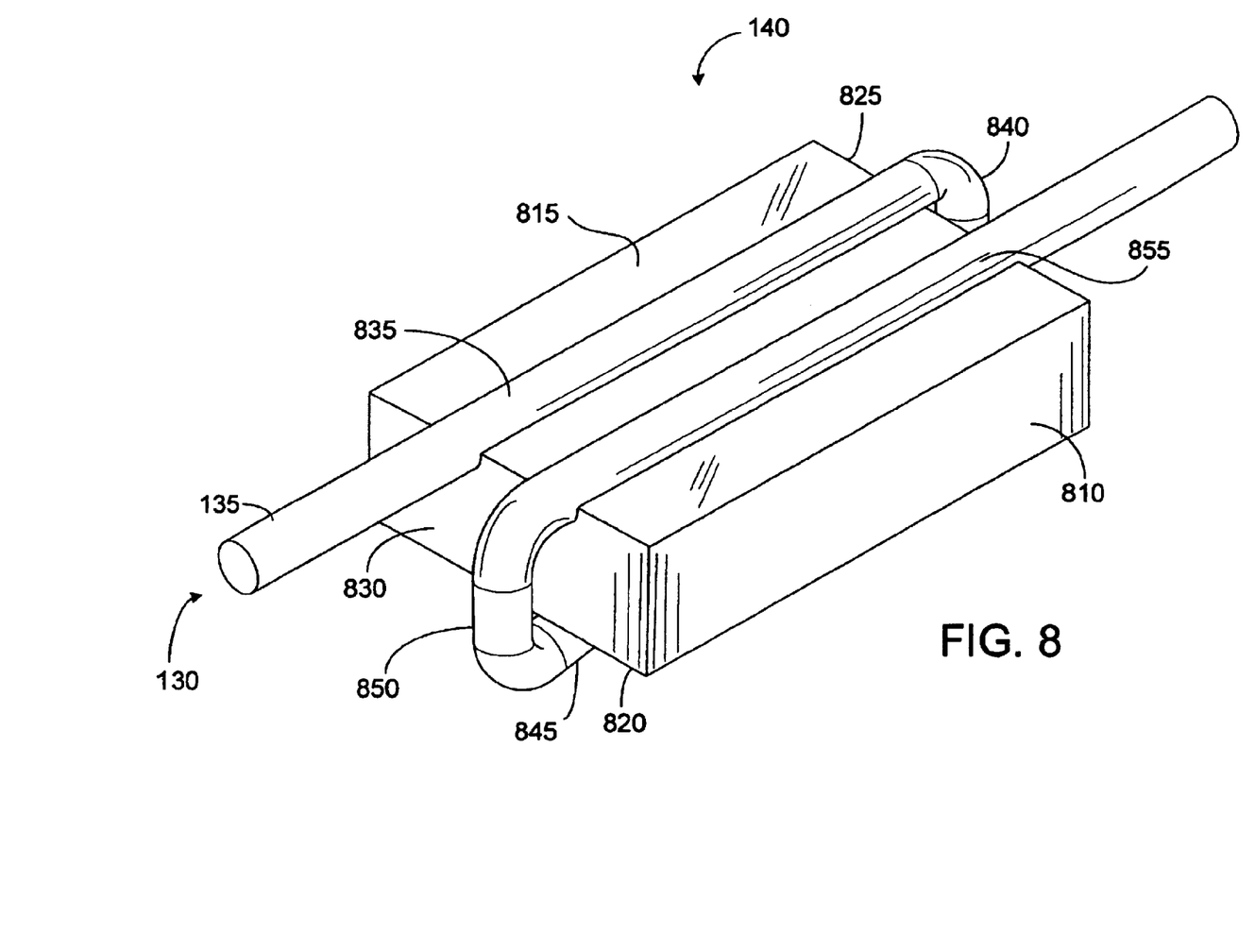
FIG. 8 is a perspective view of another implementation of the clamp-on low power isolation transformer.

As shown in FIG. 8, an exemplary clamp-on isolation transformer 140 includes a first portion 810. The first portion 810 includes a transformer core made of a magnetizable material such as, for example, iron. As shown, the primary conductor 135 of the primary current loop 130 is wound around the first portion 810. There may be one or more turns of the winding around the first portion 810. The first portion 810 includes an upper surface 815, a lower surface 820, a first side surface 825, and a second side surface 830.

The first portion 810 is configured to receive the primary conductor 135. In particular, the upper surface 815 is configured to receive a first upper portion 835 of the primary conductor 135, the first side surface 825 is configured to receive a first side portion 840 of the primary conductor, the lower surface 820 is configured to receive a lower portion 845 of the primary conductor, the second side surface 830 of first portion 810 is configured to receive a second side portion 850 of the primary conductor, and the upper surface 815 of the first portion 810 is configured to receive a second upper portion 855 of the primary conductor.

Figure 9:
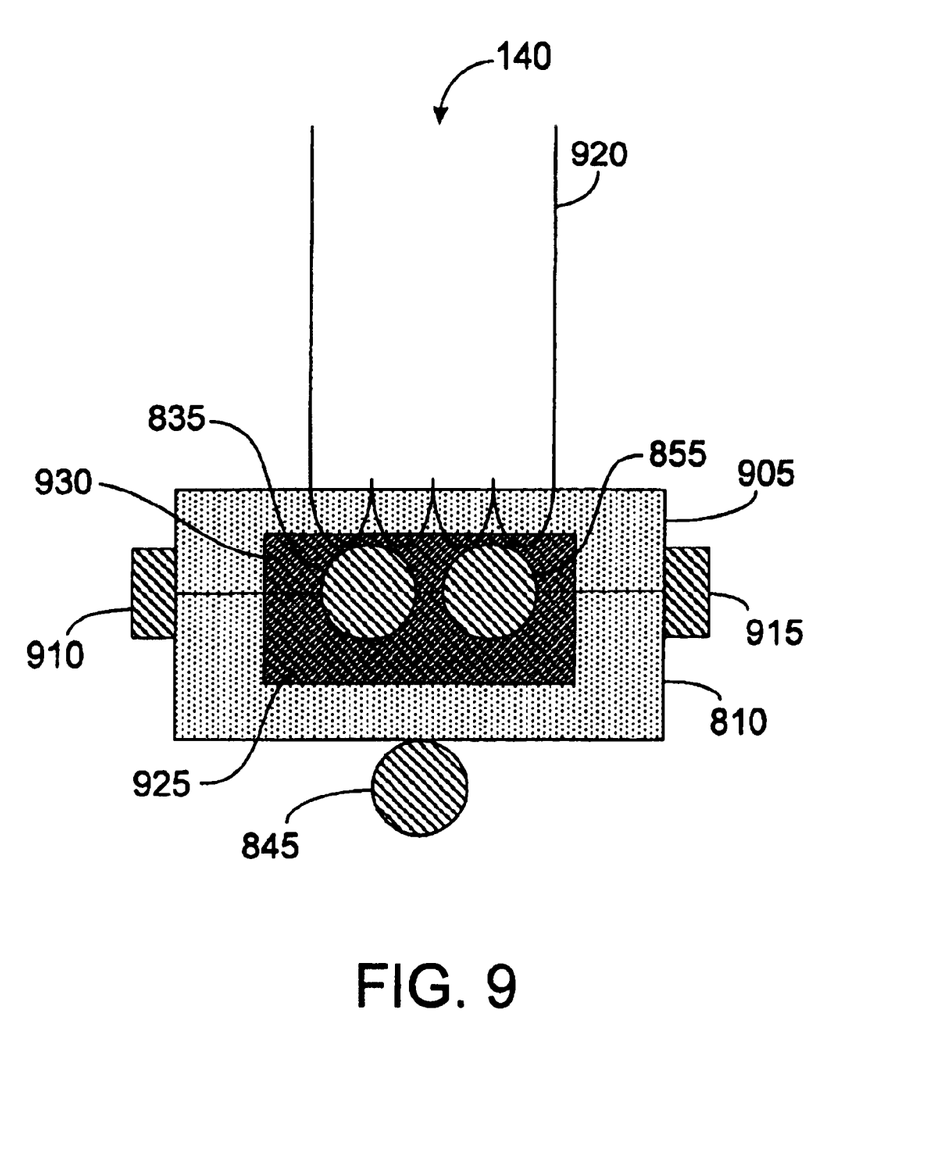
FIGS. 9 and 11 are cut-away end views of implementations of the clamp-on low power isolation transformer of FIG. 8.

As shown in FIG. 9, an exemplary clamp-on isolation transformer 140 includes a first portion 810 and a second portion 905. The second portion 905 may include a transformer core made of a magnetizable material such as, for example, iron. As shown, a secondary winding 920 is located in the second portion 905. In another implementation, the secondary winding 920 may be located in the first portion 810, and a secondary winding may be located in each of the first portion 180 and the second portion 905.

Attachment mechanisms 910 and 915 are provided to secure the first portion 810 in a position relative to the second portion 905. The attachment magnetisms 910 and 915 assisting clamping the first portion 810 and the second portion 905 of the transformer 140 to the primary conductor 135 of the primary current loop 130. To the install the transformer 140, the primary conductor 135 of the primary current loop 130 is wound around the first portion 810. The second portion 905 is then positioned and secured in place with the assistance of attachment mechanisms 910 and 915. The primary loop 130 does not need to be spliced in order to attach the clamp-on transformer 140. In addition, insulation does not need to be removed from the primary conductor 135 in order to attach the transformer 140. Once attached to the primary loop 130, the transformer 140 transfers power from the primary loop 130 to the lighting fixture 115 (shown in FIG. 1).

Figure 10:
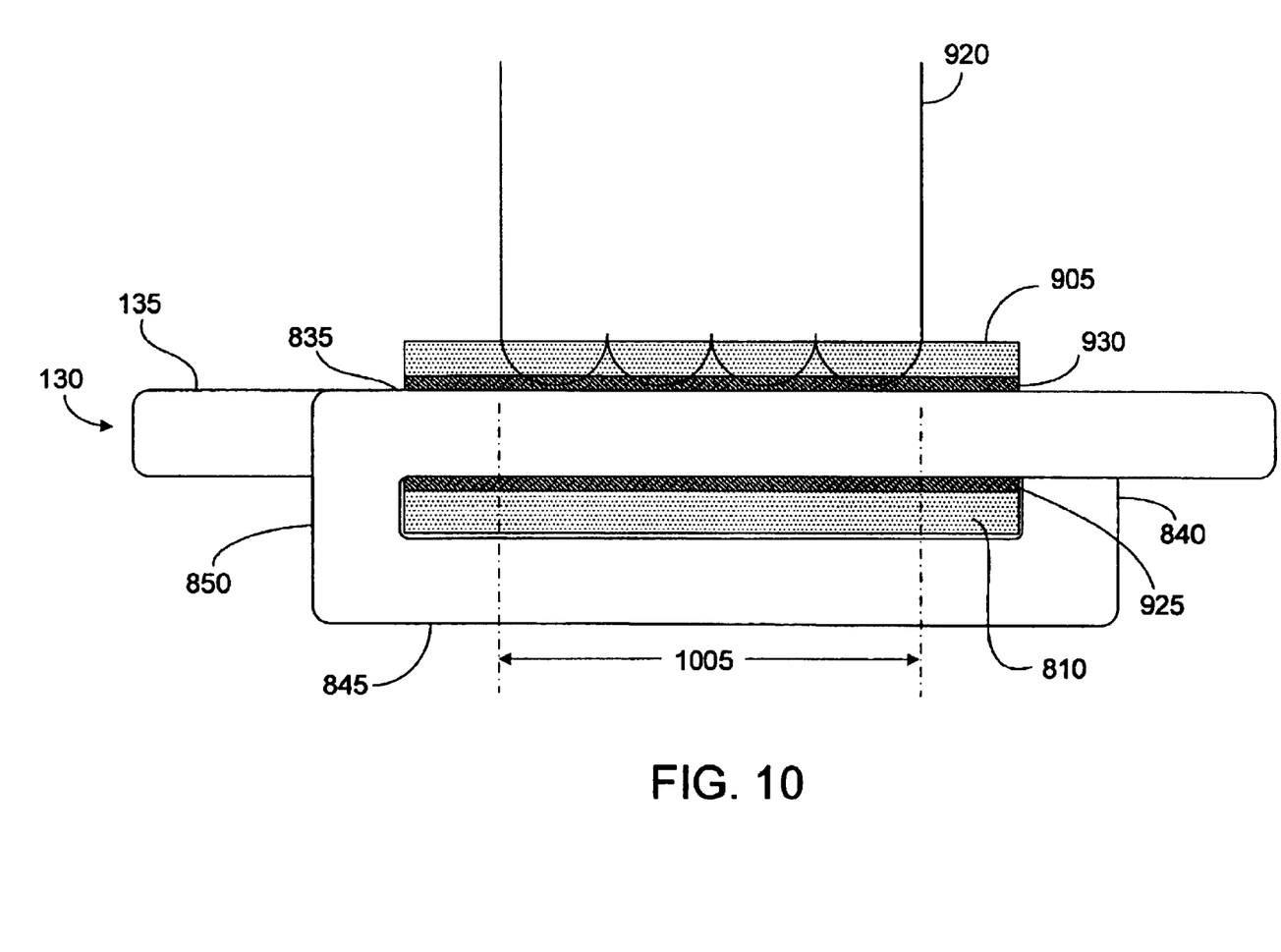
FIGS. 10 and 12 are cut-away side views of implementations of the clamp-on low power isolation transformer of FIG. 8.

As shown in FIG. 9, the use of multiple turns of the primary conductor 135 increases the power transferred from the transformer 140 to the lighting fixture 115 when compared to a similar transformer with fewer turns of the primary conductor 135. Alternatively, the use of the multiple turns of the primary conductor 135 enables a relatively shorter transformer to be used compared to a transformer having a fewer or no turns of the primary conductor 135 to transfer an equivalent amount of power. As shown in FIGS. 9 and 10, the second portion 905 includes a second core window 930 and the first portion 810 includes a first core window 925. The first portion 810 and the second portion 905 and/or the first core window 925 and the second core window 930 may be shaped so as to receive a portion of the primary conductor 135. As shown, the primary conductor 135 is wound with one or more turns around the first portion 810. Additionally, a secondary winding 920 is wrapped around the second portion 905. As shown particularly in FIG. 10, the secondary winding 920 is wrapped around the second portion 905 for a length 1005 of the second portion.

Figure 11:
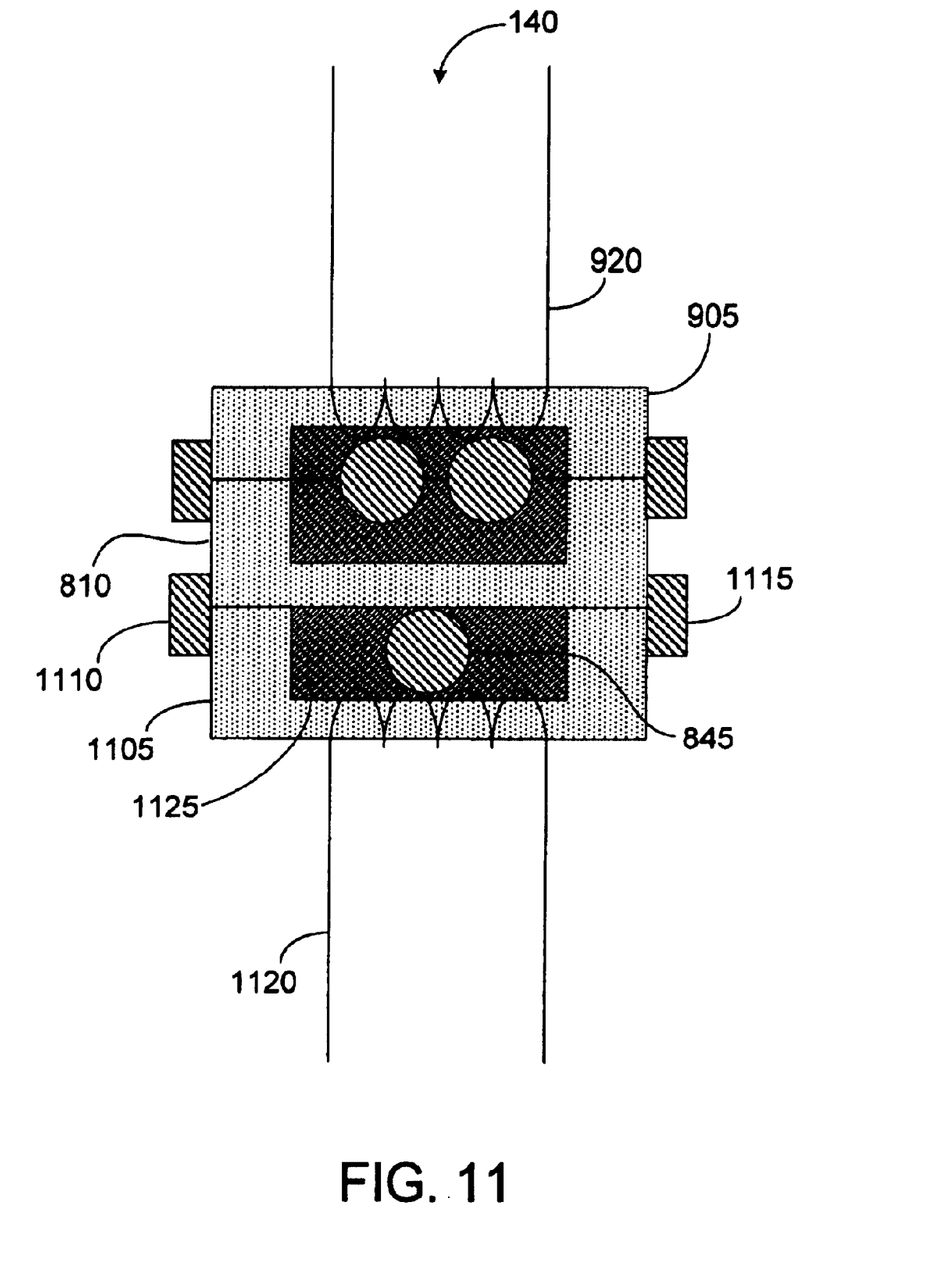
Figure 12:
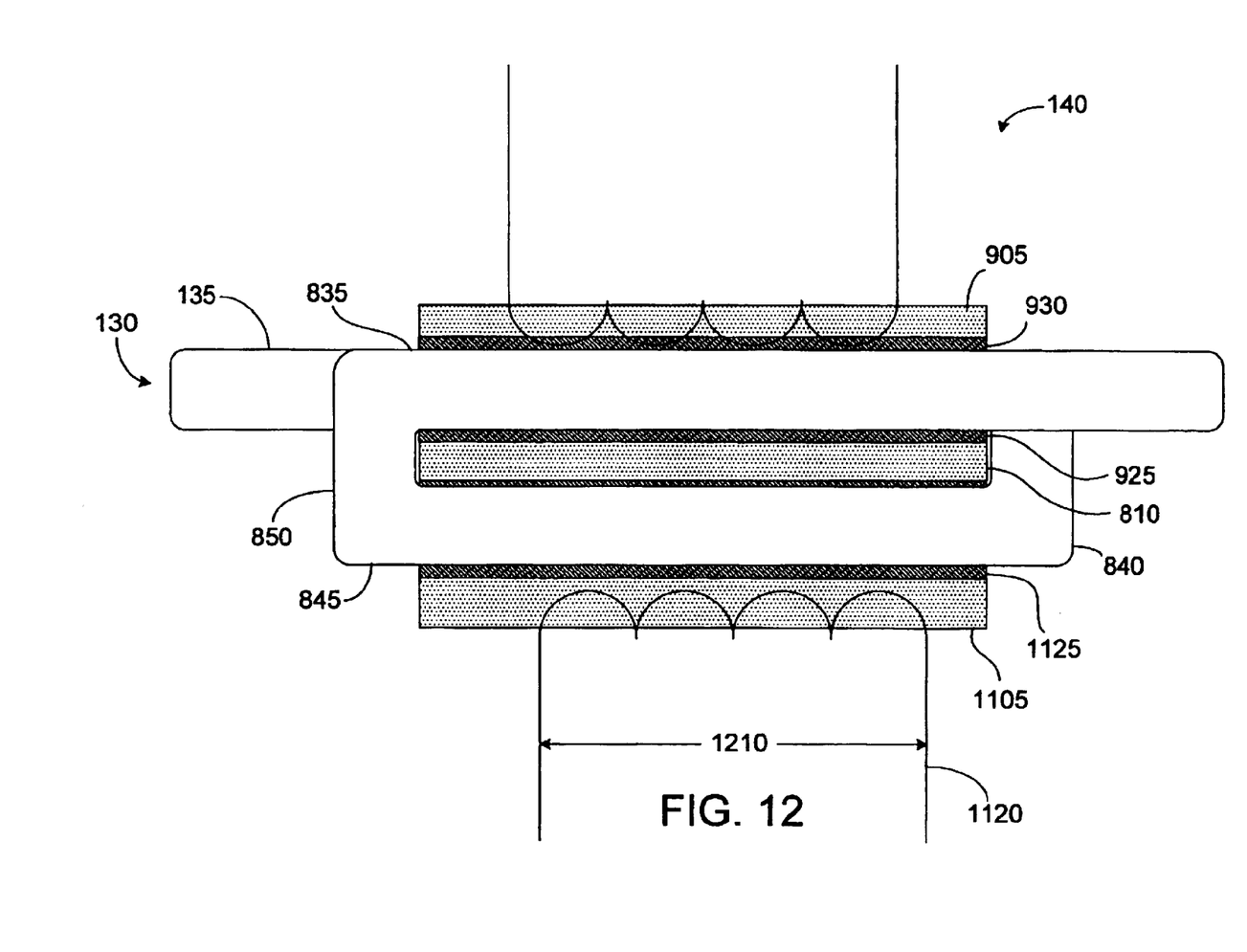

As shown in FIGS. 11 and 12, an exemplary clamp-on isolation transformer 140 includes a first portion 810, a second portion 905, and a third portion 1105. Attachment mechanisms 1110 and 1115 are configured to secure the position of the third portion 1105 and the first portion 810 with respect to each other and with respect to the primary conductor 135, in particular, with respect to the lower portion 845 of the primary conductor 135. A second secondary wound 1120 may be wind around third portion 1105 to transfer power from the lower portion 845 of the primary conductor 135 to a lighting fixture, such as lighting fixture 115 (shown in FIG. 1). As shown in FIG. 11, the third portion 1105 includes a third core window 1125. As shown in particularly in FIG. 12, the primary conductor 135 is wound with one or more turns around the first portion 810. The second portion 905 is located such that the top portion 835 of the primary conductor 135 is between the first portion 810 and the second portion 905. The third portion 1105 is located such that the lower portion 845 of the primary conductor 135 is between the first portion 810 and the third portion 1105. The second secondary winding 1120 is wrapped around the third portion 1105 for a length 1210 of the third portion 1105.

A number of implementations have been described. Nevertheless, various modifications may be made. Accordingly, other implementations are within the scope of the following claims.

What is claimed is:

1. A clamp-on isolation transformer for an airfield lighting fixture in an airfield lighting system, the transformer comprising:
   a body having a continuous channel that extends from a first opening at a first end of the body to a second opening at a second end of the body such that, during use, a primary conductor of a primary current loop extends continuously from the first opening to the second opening along the channel, the body including a first portion and a second portion that are movable relative to each other to open at least one side of the channel extending from the first opening to the second opening to permit insertion of the conductor through the open side;
   an attachment mechanism configured to attach the first portion to the second portion to close the open side of the channel; and
   a first winding coupled to the first portion and configured to be attached to an airfield lighting fixture.

2. The transformer of claim 1 further comprising a low power airfield lighting fixture connected to the first winding.

3. The transformer of claim 2 in which the low power airfield lighting fixture comprises an LED lighting fixture.

4. The transformer of claim 1 in which the attachment mechanism comprises a hinge attached to the first portion and the second portion.

5. The transformer of claim 1 in which the attachment mechanism comprises a locking mechanism.

6. The transformer of claim 1 in which the first portion is constructed to be at least partially connected to the second portion.

7. The transformer of claim 1 in which the first portion comprises a first core and the second portion comprises a second core.

8. The transformer of claim 7 in which the first core defines a first core window and the second core defines a second core window.

9. The transformer of claim 1 in which the second portion comprises a second winding coupled to the second portion and configured to be attached to the airfield lighting fixture.

10. The transformer of claim 9 further comprising an electrical connection configured to be connected between the first winding and the second winding.

11. The transformer of claim 1 wherein:
   the body has a second continuous channel that extends from a third opening at the first end of the body to a fourth opening at the second end of the body; and
   during use, the primary conductor is looped about the first or second portion such that the primary conductor also extends continuously from the third opening to the fourth opening along the second channel.

12. The transformer of claim 11 further comprising a third portion configured to be attached to the second portion and to receive a portion of the primary conductor located between the second portion and the third portion.

13. A clamp-on isolation transformer for an airfield lighting fixture in an airfield lighting system, the transformer comprising:
   means for forming a body having a continuous channel that extends from a first opening at a first end of the body to a second opening at a second end of the body such that, during use, a primary conductor of a primary current loop extends continuously from the first opening to the second opening along the channel; and
   a first winding coupled to the means and configured to be attached to an airfield lighting fixture.

14. The transformer of claim 13 further comprising a second winding coupled to the means and configured to be attached to an airfield lighting fixture.

15. The transformer of claim 14 further comprising a means for connecting the first winding and the second winding.

16. The transformer of claim 13 wherein the transformer comprises one or more turns of the primary conductor.

17. An airfield lighting system comprising:
   an AC current source connected to a primary conductor so as to form a primary current loop;
   a clamp-on isolation transformer coupled to the primary conductor, the clamp-on isolation transformer comprising:
      a body having a continuous channel that extends from a first opening at a first end of the body to a second opening at a second end of the body such that the primary conductor extends continuously from the first opening to the second opening along the channel, the body including a first portion and a second portion that are movable relative to each other to open at least one side of the channel extending from the first opening to the second opening to permit insertion of the conductor through the open side;
      an attachment mechanism configured to attach the first portion to the second portion to close the open side of the channel; and
      a first winding coupled to the first portion and configured to be attached to an airfield lighting fixture; and
   a low power airfield lighting fixture connected to the first winding.

18. The airfield lighting system of claim 17 in which the low power airfield lighting fixture comprises an LED lighting fixture.

19. The airfield lighting system of claim 17 in which the second portion comprises a second winding coupled to the second portion and connected to the low power airfield lighting fixture.

20. The airfield lighting system of claim 19 further comprising an electrical connection configured to be connected between the first winding and the second winding.

21. The airfield lighting system of claim 17 wherein:

the body has a second continuous channel that extends from a third opening at the first end of the body to a fourth opening at the second end of the body; and the primary conductor is looped about the first or second portion such that the primary conductor also extends continuously from the third opening to the fourth opening along the second channel.

22. The airfield lighting system of claim 21 farther comprising a third portion configured to be attached to the second portion and to receive a portion of the primary conductor located between the second portion and the third portion.

23. A method of installing a clamp-on isolation transformer for an airfield lighting fixture in an airfield lighting system, wherein the clamp-on isolation transformer includes a body having a continuous channel that extends from a first opening at a first end of the body to a second opening at a second end of the body, the body including a first portion and a second portion that are movable relative to each other to open at least one side of the channel extending from the first opening to the second opening to permit insertion of the conductor through the open side, the method comprising:

moving the first portion and the second portion relative to each other to open the side of the channel;

inserting a primary conductor of a primary current loop into the channel through the open side of the channel such that the Primary conductor extends continuously from the first opening to the second opening along the channel; and attaching the first portion to the second portion to close the open side of the channel.

24. The method of claim 23 wherein a winding is coupled to the first portion and is configured to be attached to an airfield lighting fixture, the method further comprising connecting an airfield lighting fixture to the winding.

25. The method of claim 23 wherein the body has a second continuous channel that extends from a third opening at the first end of the body to a fourth opening at the second end of the body and the first and second portion are moveable relative to each other to open at least one side of the second channel extending from the third opening to the fourth opening to permit insertion of the conductor through the open side of the second channel, the method further comprising:

looping the primary conductor about the first or second portion;

inserting the primary conductor into the second channel through the open side of the second channel such that the primary conductor also extends continuously from the third opening to the fourth opening along the second channel.

26. The method of claim 25 further comprising positioning a third portion of the clamp-on isolation transformer to receive a portion of the primary conductor at a location opposed to the channels.

* * * * *